TAPE RECORDER HAVING A BRUSHLESS D.-C. MOTOR FOR TAPE FEEDING

Filed Nov. 24, 1964 2 Sheets-Sheet 1

SECTION A-A

INVENTOR.
Kazutoshi Ikegami

BY

Mattern & Mattern

TAPE RECORDER HAVING A BRUSHLESS D.-C. MOTOR FOR TAPE FEEDING

Filed Nov. 24, 1964 2 Sheets-Sheet 2

INVENTOR.
Kazutoshi Ikegami
BY
Malcolm E. Mcston 3,317,803
Patented May 2, 1967

3,317,803

TAPE RECORDER HAVING A BRUSHLESS D.-C. MOTOR FOR TAPE FEEDING

Kazutoshi Ikegami, Kokubunji-machi, Kitatama-gun, Tokyo-to, Japan, assignor to Kabushiki Kaisha Hitachi Seisakusho, Tokyo-to, Japan, a joint-stock company of Japan Filed Nov. 24, 1964, Ser. No. 413,468
Claims priority, application Japan, Nov. 27, 1963, 38/63,298
1 Claim. (Cl. 318—138)

This invention relates to recorders commonly referred to as tape recorders, and more particularly it relates to a new tape recorder wherein a brushless D.-C. motor is used for feeding the recording tape.

In miniature tape recorders, in general, miniature D.-C. motors (micro-motors) driven by a D.-C. power source (storage cells) are widely used as motors for feeding the recording tape. However, since such motors have brushes, not only is their maintenance difficult, but noise due to sparking occurring at the contact parts of the brushes and commutators becomes mixed with recorded sounds, thereby giving rise to the disadvantage of lowered signal-to-noise ratio.

It is a general object of the present invention to overcome these difficulties by a relatively simple arrangement and construction of parts.

According to the present invention, briefly stated, there is provided a tape recorder wherein, instead of a conventional brush-type micro-motor, a brushless motor in which the angular position of the rotor is detected by a non-contacting device through utilization of radio-frequency signals, and transistors are operated in accordance with the resulting detection signals to accomplish control of the armature current (said brushless motor being referred to hereinafter as an "RF motor") is used to eliminate sparking and noise, and wherein, moreover, the functions of an oscillator for A.-C. bias signals of the tape recorder and a radio-frequency oscillator for detecting the rotor position of the RF motor are accomplished by a single oscillator, whereby substantial simplification of the required circuit is achieved.

The specific nature, principle, and details of the invention will be apparent from the following detailed description of a preferred embodiment of the invention, when read in conjunction with the accompanying drawings in which like parts are designated by like reference characters, and in which:

FIGURE 3(*a*) is a cross sectional view taken along the plane indicated by line A—A in FIGURE 3(*b*); and FIGURE 3(*c*) is an end view of the motor shown in FIGURE 3(*b*).

Figure 1:
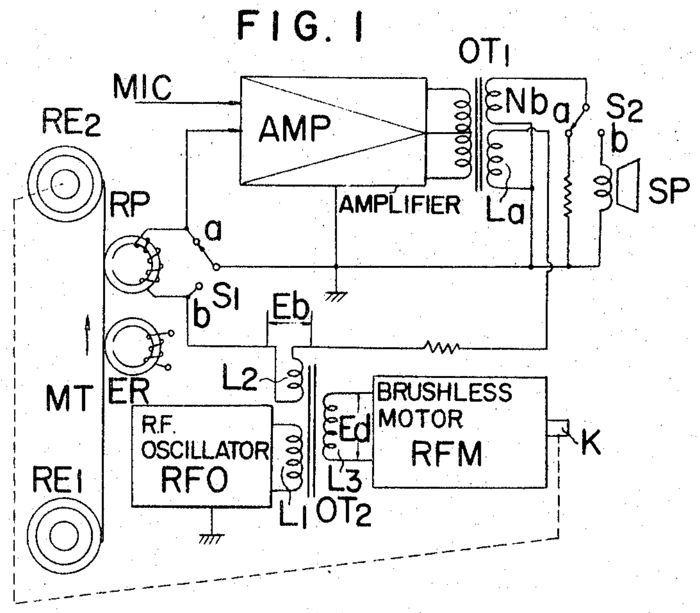
FIGURE 1 is a schematic diagram showing the general arrangement and composition of the embodiment of the tape recorder according to the invention.

Referring to FIGURE 1, the tape recorder of this invention comprises essentially a recording and reproducing head RP, an erasing head $E_R$, a magnetic tape MT, magnetic tape reels $R_{E1}$ and $R_{E2}$, an amplifier AMP for signals to be recorded or signals to be reproduced, an output transformer $OT_1$, a radio-frequency oscillation circuit RFO, an output transformer $OT_2$ for said oscillation circuit, the above mentioned RF motor RFM having a shaft K which is coupled to and drives the reels $R_{E1}$ and $R_{E2}$, and a speaker SP.

The tape recorder of the above described arrangement operates in the following manner. A radio-frequency signal of a frequency of the order of 30 to 80 kc. is generated by the radio-frequency oscillator RFO and is supplied to the primary winding $L_1$ of the output transformer $OT_2$. Then, from the first output winding $L_2$ of this transformer $OT_2$, an A.-C. bias signal $E_b$ for magnetic recording is obtained, and a radio-frequency signal $E_d$ for detecting the angular position of the RF motor RFM is obtained from the second output winding $L_3$. The signal $E_a$ is induced through a rotational coaxial transformer within the RF motor on the rotor shaft as described hereinafter.

When the switches designated by reference characters $S_1$ and $S_2$ are closed on their respective *a* sides as shown in FIGURE 1, the tape recorder is in the recording state, in which the audio signal from a microphone MIC is amplified in the amplifier AMP and then supplied to the output transformer $OT_1$. The resulting recording signal $e_s$ produced in the first output winding $L_a$ of the transformer $OT_1$ and the A.-C. bias signal $E_b$ produced in the first output winding $L_2$ of the output transformer $OT_2$ of the oscillation circuit are superimposed, and the resulting superimposed signal is supplied to the winding of the head RP, whereby recording is accomplished.

For reproduction, the switches $S_1$ and $S_2$ are closed on their respective *b* sides opposite to the *a* sides shown, whereupon the recorded signal induced in the coil of the head RP is amplified in the amplifier AMP, and the amplified signal thereby produced in the second output winding $N_b$ of the output transformer $OT_1$ passes through the switch $S_2$ and is supplied to the speaker SP, whereby reproduction is accomplished.

Erasure is accomplished by supplying a D.-C. or an A.-C. erasing signal to the coil of the erasing head $E_R$.

For parts such as the driving mechanism for the reels $R_{E1}$ and $R_{E2}$ driven by the motor RFM, the amplifier AMP, and the radio-frequency oscillation circuit RFO, a known mechanism and known circuits can be used.

It is a unique feature of the present invention that, by the above described arrangement and composition, a radio-frequency signal $E_d$ for detection of position necessary for the RF motor and an A.-C. bias signal $E_b$ to be supplied to the recording head RP are obtained simultaneously from a single radio-frequency oscillation circuit RFO. Since, by this arrangement, the frequencies of these two signals $E_d$ and $E_b$ are exactly the same, the development of a beat signal caused by a frequency difference between the two signals is prevented, and, accordingly, noise due to such a beat is not generated. Moreover, since only a single radio-frequency oscillator is sufficient, the entire circuit is substantially simplified.

A further unique and important feature of the tape recorder according to this invention is that the motor used therein is of a fully non-contact or brushless type, whereby there is no possibility of noise becoming mixed with the recorded signals, and a tape recorder with a very high signal-to-noise ratio can be provided. At the same time, the life of the motor is several times that of conventional brush type micro-motors, and maintenance is greatly facilitated. Thus, the principal requirements for tape recorders are satisfied by the tape recorder according to the present invention.

Figure 3A:
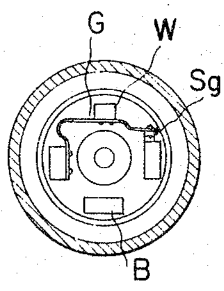
FIGURE 3(*b*) is a side view, partly in longitudinal section and with a part cut away, showing a brushless motor suitable for use in the tape recorder according to the invention.
Figure 3B:
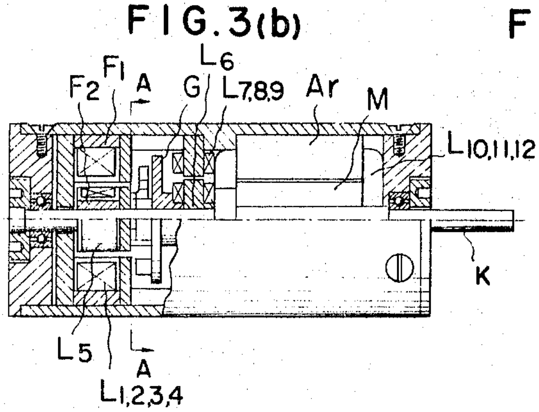
Figure 3C:
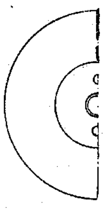
Figure 2:
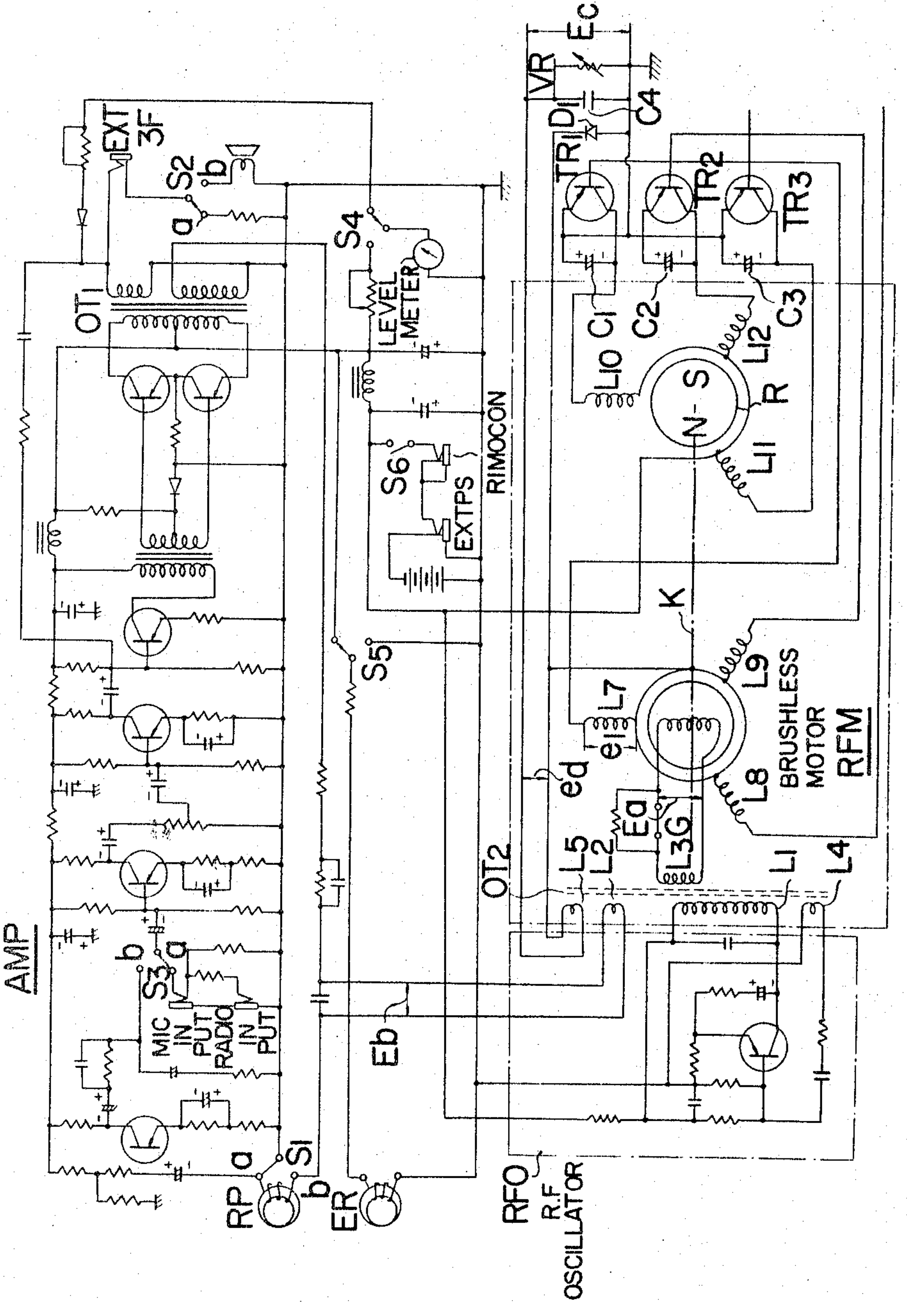
FIGURE 2 is a circuit diagram indicating a specific example of a circuit suitable for the arrangement of the embodiment.

While the principle of the RF motor used in the above described tape recorder of this invention has been disclosed in Japanese patent application publication No. 38/2158, the following description with respect to a specific embodiment of the invention is presented with reference to FIGURE 2 showing a specific and practical example of the RF motor and a specific circuit for the tape recorder according to the invention and to FIGURE 3 showing the construction of the RF motor main assembly.

The output transformer $OT_2$ of the radio-frequency oscillation circuit RFO has the additional function of a rotation coupling transformer for inducing a position detection signal $E_d$ on the rotor shaft K of the RF motor. More specifically, as stationary coils of this transformer, coils $L_1$ and $L_4$ for oscillation coupling, the coil $L_2$ for extracting the A.-C. bias signal $E_b$, and a coil $L_5$ for extracting the phase discrimination signal $e_d$ are wound concentrically about a ring-shaped core $F_1$ (FIGURE 3). Inside of this ring-shaped core $F_1$, there is disposed a coil $L_3$ for extracting the position detection signal $E_d$, said coil $L_3$ being supported on the shaft K. Although this coil $L_3$ rotates together with the shaft K, a radio-frequency signal from the oscillation circuit RFO is continually induced therein irrespective of its rotational angle, and the induced output $E_d$ is supplied to a second rotating coil $L_6$. Around the rotational path of this rotating coil $L_6$, there are disposed pickup coils $L_7$, $L_8$, and $L_9$ spaced circumferentially at equal intervals.

Accordingly, a radio-frequency signal is induced by magnetic coupling in one of the three pickup coils $L_7$, $L_8$, and $L_9$ depending on the angular position of the rotating coil $L_6$. For example, when the coil $L_6$ is in the position indicated in FIGURE 2, a radio-frequency signal $e_1$ is generated in the pickup coil $L_7$. The radio-frequency signal produced in this manner in one of the pickup coils is phase detected by the radio-frequency signal $e_d$ of a constant phase produced in the discrimination coil $L_5$, and the resulting output is supplied to one of three switching transistors $TR_1$, $TR_2$, and $TR_3$. For example, in the case indicated in FIGURE 2, as the result of coincidence of the phases of the signals $e_d$ and $e_1$, a combined radio-frequency signal $e_d+e_1$ is applied to the transistor $TR_1$, which is thereupon caused to assume its conductive state.

In this case, capacitors $C_1$, $C_2$, and $C_3$ are connected respectively between the emitters and collectors of the switching transistors, and through the existence of these capacitors, detection and, moreover, amplification of the radio-frequency signals applied to the bases are accomplished by these switching transistors, themselves. The collectors of the switching transistors $TR_1$, $TR_2$, and $TR_3$ are also connected respectively to armature coils $L_{10}$, $L_{12}$, and $L_{11}$ of the rotor R of the motor as shown in FIGURE 2.

Accordingly, when a radio-frequency signal $e_1$ is produced in the pickup coil $L_7$, the transistor $TR_1$ is placed in the conductive state, and its collector current flows through the armature coil $L_{10}$, whereby a torque is developed to cause the rotor R to rotate in one direction. Then, as the rotor R is caused by this torque to rotate, the rotating coil $L_6$ also rotates therewith. Consequently, a radio-frequency signal is induced in the next pickup coil, for example, pickup coil $L_9$, and the resulting output places the transistor $TR_2$ in the conductive state, whereby a current flows through the armature coil $L_{12}$, and a torque is produced to cause the rotor R to rotate in the same direction as mentioned above. Thereafter the same operation is effected for the combination of the pickup coil $L_8$, transistor $TR_3$, and armature coil $L_{11}$.

The radio-frequency signal produced in each pickup coil is inverted in phase for each 180-degree rotation of the rotating coil $L_6$ and is, therefore, canceled by the discrimination signal $e_d$. Accordingly, the development of a torque tending to rotate the rotor R in the reverse direction is obviated, and the rotor R rotates smoothly in one direction.

The discrimination signal $e_d$ is rectified by a rectifier circuit comprising a diode $D_1$, a capacitor $C_4$, and a variable resistance VR, and the resulting D.-C. voltage $E_c$ is utilized as a reverse bias voltage commonly for the three transistors $TR_1$, $TR_2$, and $TR_3$. Adjustable variation of the variable resistance VR causes the voltage $E_c$ to vary, whereby the magnitudes or the widths of the conductive times of the collector currents of the transistors $TR_1$, $TR_2$, and $TR_3$ are varied, and it is possible to adjust thereby the rotational speed of the rotor R.

The motor RFM is provided therewithin with a governor G having a weight W, a balance weight B, and an electrical contact device *Sg*, which is opened by centrifugal force acting on the weight W. When the rotation speed of the rotor exceeds a predetermined value, the contact *Sg* is opened, whereby the input signal $E_d$ to the rotating coil $L_6$ is cut off. Consequently, a radio-frequency signal is not produced in any of the pickup coils $L_7$, $L_8$, and $L_9$. Accordingly, no current whatsoever flows in the armature coils, and no rotational torque is produced. When, as a result, the rotational speed of the rotor drops, the contact *Sg* again closes, torque is again produced by the operation described above, and the rotational speed is thereby maintained close to the predetermined value.

In FIGURE 3, reference character *Ar* designates the armature of the RF motor. Phase inversion of this RF motor is accomplished by switching the connection terminals of the discrimination coil $L_5$ by means of a switch, whereby it is possible to reverse the direction of rotation of this motor.

The opening and closing operation of the contact *Sg* of the governor G causes some variation in the A.-C. bias signal $E_b$ obtained from the coil $L_2$, but when this variation becomes a problem, the output of this coil $L_2$ may be supplied to the recording head after it has been first passed through a buffer amplifier circuit. Another method in this case is to multiply the output of the coil $L_2$ and use it as the A.-C. bias signal. Alternatively, an amplitude limiting device may be introduced by a component such as a Zener diode into the recording bias circuit to supply a radio-frequency signal of constant amplitude to the recording head.

Since the circuit parts for recording, reproducing, and amplifying shown in FIGURE 2 are composed of generally known circuits, detailed description relating thereto is herein omitted. However, it should be mentioned that the switch designated by reference character $S_3$ is intercoupled with the switches $S_1$ and $S_2$. In addition, there are provided an erasing switch $S_5$, a power supply switch $S_6$, and a level meter switch $S_4$. Although the reproducing head and recording head are shown as being incorporated doubly in one head, these heads may be provided separately.

The recording and reproducing parts other than the motor tape feeding according to the present invention are not limited to those illustrated in the example shown in FIGURE 2. That is, the several practical advantages as described hereinbefore can be attained by applying the present invention to tape recorder of the A.-C. bias recording type.

Furthermore, the RF motor which is an important and unique feature of the invention is not limited to that illustrated in FIGURE 2, being modifiable in various details such as the adoption of a capacitive coupling method, the number of poles in the rotor or stator, and the arrangement and construction of the coupling between the output part of the oscillator and the motor.

Accordingly, it should be understood that the foregoing disclosure relates to only a preferred embodiment of the invention and that it is intended to cover all changes and modifications of the example of the invention herein chosen for the purposes of the disclosure, which do not constitute departure from the spirit and scope of the invention as set forth in the appended claim.

What I claim is:

In a tape recorder of the A.-C. bias recording type, the combination comprising a radio-frequency oscillation circuit, a brushless, direct-current motor for feeding the recording tape, said motor having a rotor and an armature, means to induce a radio-frequency signal on the rotor in accordance with the output of said oscillation circuit, means to detect said radio-frequency signal in accordance with the angular position of the rotor thereby to produce a detection signal, means to control the armature current with said detection signal as a control signal, and means to extract simultaneously an alternating-current bias signal to be supplied to the recording head from the output of said oscillation circuit.

No references cited.

ORIS L. RADER, *Primary Examiner.*

G. SIMMONS, *Assistant Examiner.*